(12) United States Patent
Manning et al.

(10) Patent No.: US 7,331,719 B2
(45) Date of Patent: Feb. 19, 2008

(54) OPTICAL FIBER CLAMPING ASSEMBLY

(75) Inventors: Randy Marshall Manning, Lemoyne, PA (US); Lewis Edward Sauerwein, Lebanon, PA (US); Takehio Hayashi, Kanagawa (JP); David D. Erdman, Hummelstown, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/591,823

(22) Filed: Nov. 2, 2006

(65) Prior Publication Data

US 2007/0127873 A1 Jun. 7, 2007

(51) Int. Cl.
G02B 6/36 (2006.01)
(52) U.S. Cl. .............................. 385/81; 385/77; 385/62; 385/76
(58) Field of Classification Search .................. 385/53, 385/55, 56, 60, 66–68, 76–78, 81, 83, 84, 385/87, 139
See application file for complete search history.

(56) References Cited

U.S. PATENT DOCUMENTS

| 4,743,084 | A | 5/1988 | Manning |
| 4,747,656 | A | 5/1988 | Miyahara et al. |
| 4,923,274 | A | 5/1990 | Dean et al. |
| 5,077,880 | A | 1/1992 | Dean et al. |
| 5,121,456 | A | 6/1992 | Essert et al. |
| 5,363,459 | A | 11/1994 | Hultermans |
| 5,943,460 | A | 8/1999 | Mead et al. |
| 5,984,532 | A | 11/1999 | Tamaki et al. |
| 6,022,150 | A | 2/2000 | Erdman et al. |
| 6,173,097 | B1 | 1/2001 | Throckmorton et al. |
| 6,190,054 | B1 | 2/2001 | Tamaki et al. |
| 6,379,054 | B2 | 4/2002 | Throckmorton et al. |
| 6,655,851 | B1 | 12/2003 | Lee |

(Continued)

OTHER PUBLICATIONS

Corning's UNICAM data sheet entitled UniCam Single-mode Connectors, Jul. 2001.

*Primary Examiner*—Kevin S. Wood

(57) ABSTRACT

A clamping assembly having a top and bottom and front and back orientation, at least one optical axis, and a pre-actuated state in which a fiber is not secured to the clamping assembly and a post-actuated state in which a fiber is secured to the clamping assembly, the clamping assembly comprising: (a) a housing; (b) a platform disposed in the housing and being fixed therein both radially and axially, the platform defining a fiber-receiving channel along the optical axis to receive at least one fiber, at least a portion of the fiber-receiving channel being accessible from the top; (c) a first cam member disposed in the housing above and adjacent to the fiber-receiving channel, the first cam member being radially actuateable within the housing, the first cam member having a first cam surface; (d) a second cam member disposed in the housing and axially slidable therein, the second cam member having a second cam surface adjacent the first cam surface and configured such that, upon forward motion of the second cam member relative to the first cam member, the first cam member is urged downward as a result of a camming action between the first and second cam surfaces; and (e) an actuator disposed slidably within the housing behind and adjacent to the second cam member and configured such that, when moved forward, it forces the second cam member forward relative to the first cam member.

33 Claims, 10 Drawing Sheets

U.S. PATENT DOCUMENTS

2006/0002662 A1* 1/2006 Manning et al. ............... 385/78
2006/0165352 A1* 7/2006 Caveney et al. ............... 385/87
2007/0133926 A1* 6/2007 Semmler et al. ............... 385/72
2007/0217745 A1* 9/2007 Semmler et al. ............... 385/53

* cited by examiner

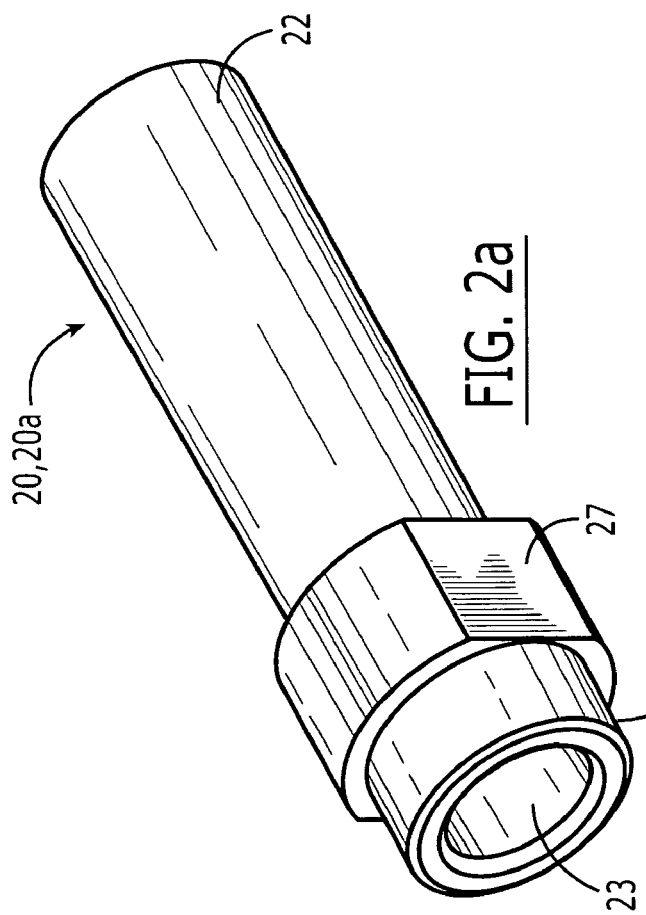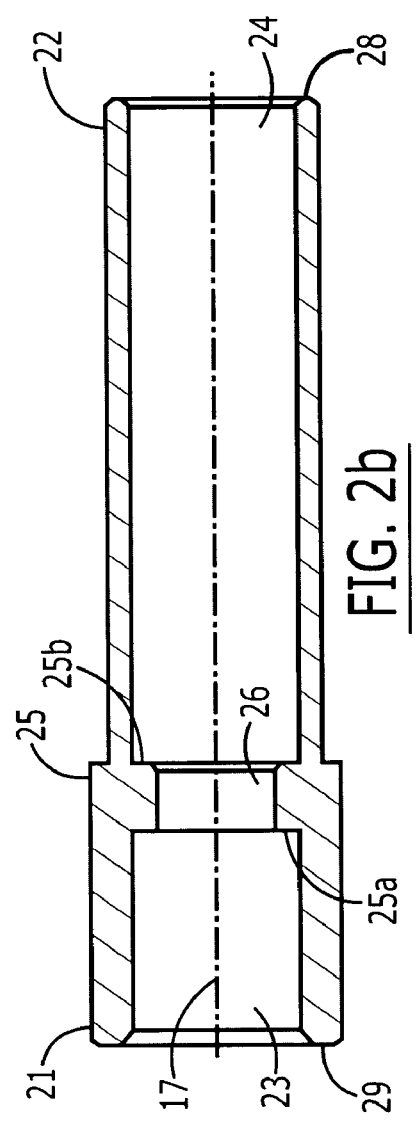

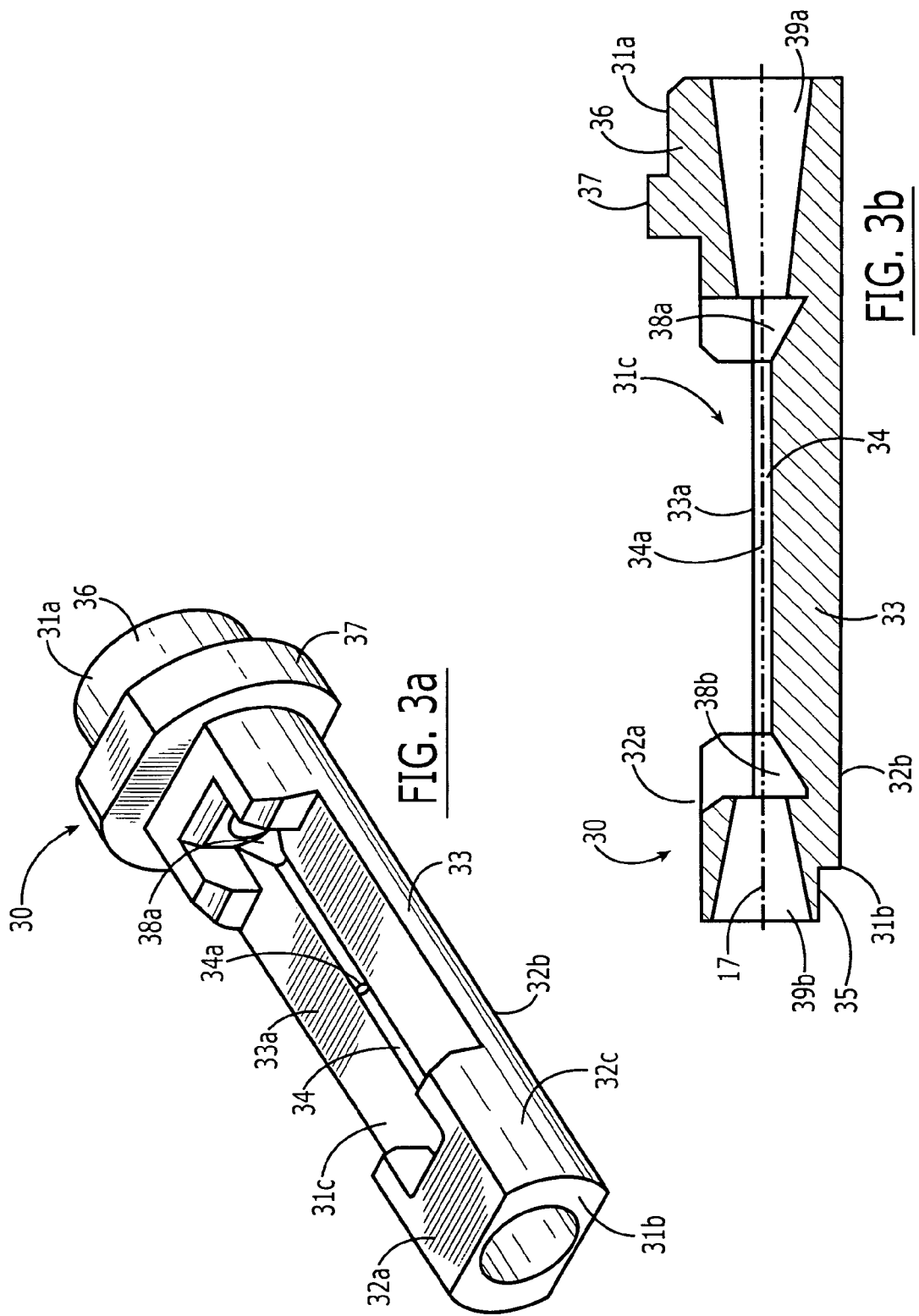

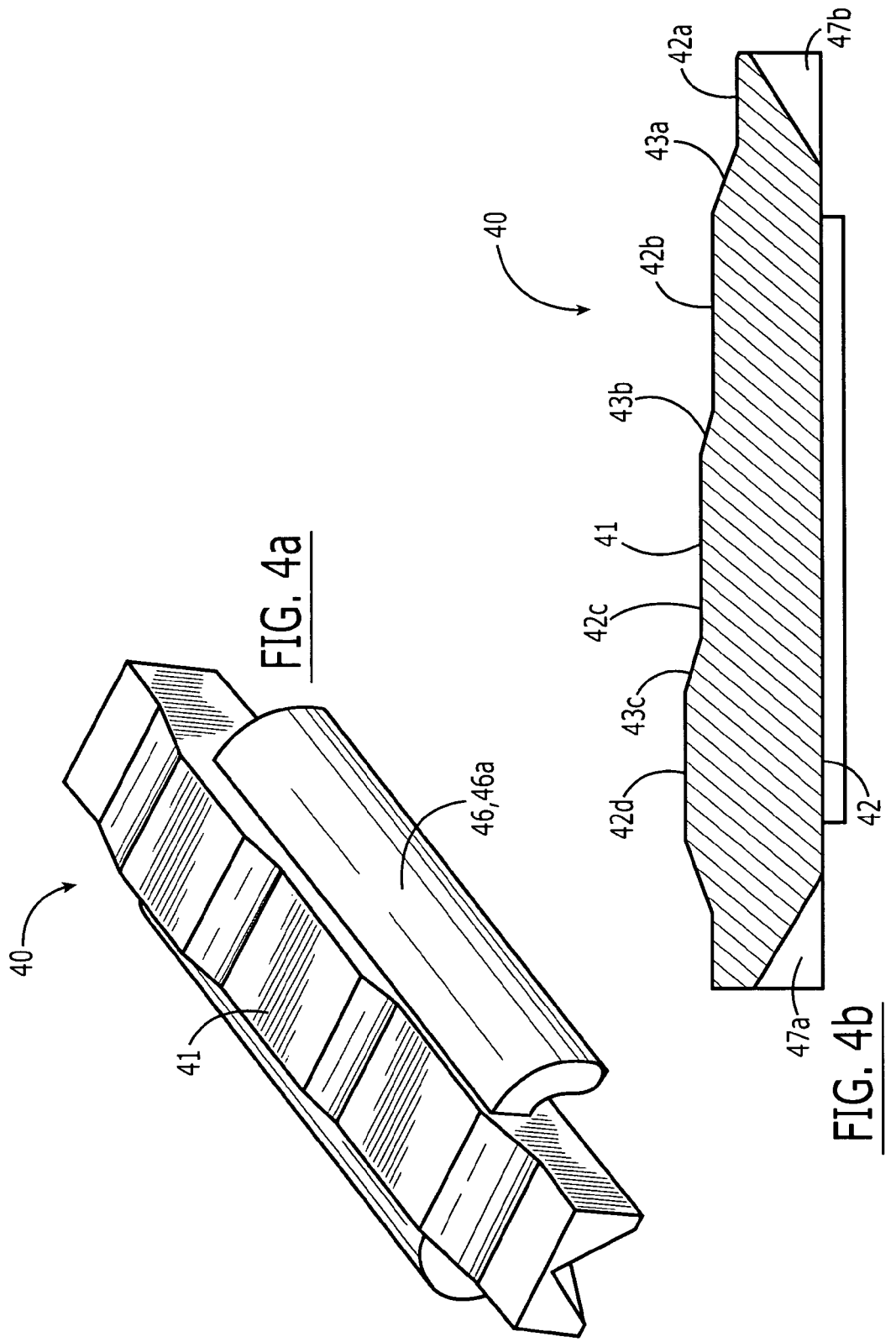

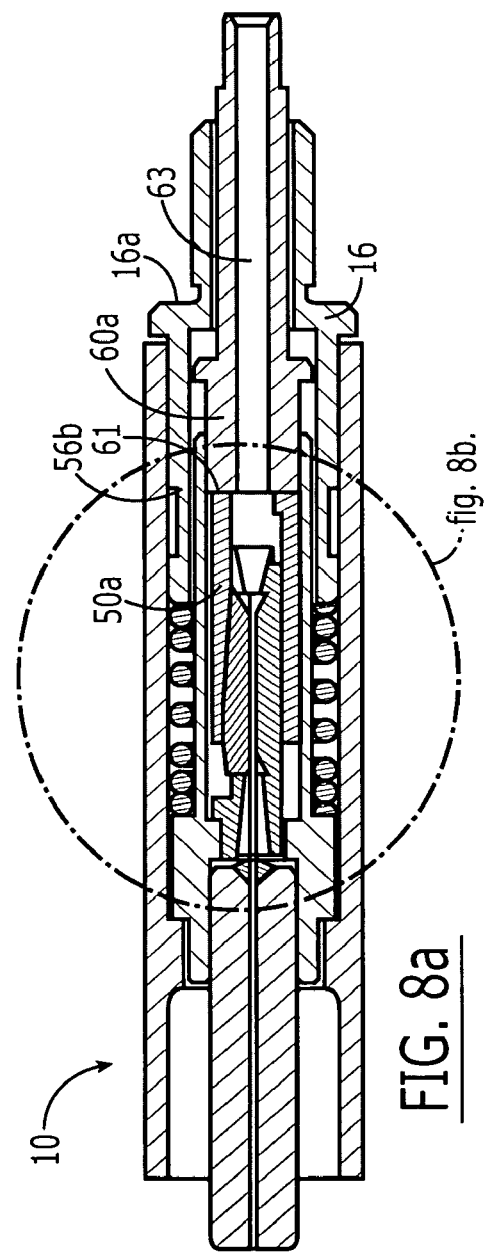
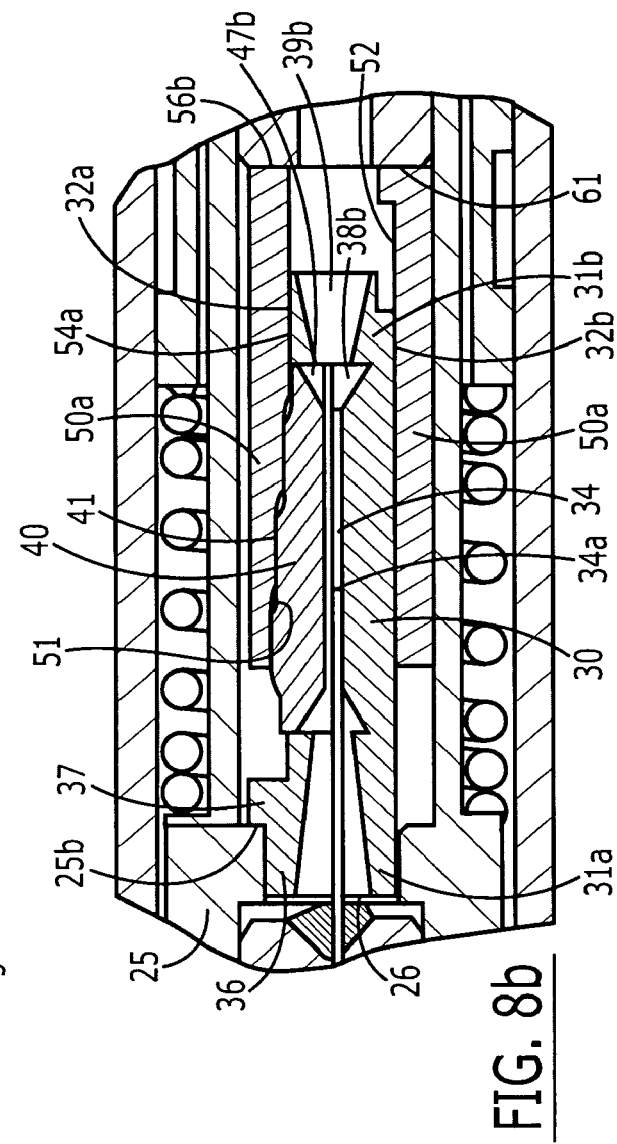
FIG. 8a
FIG. 8b

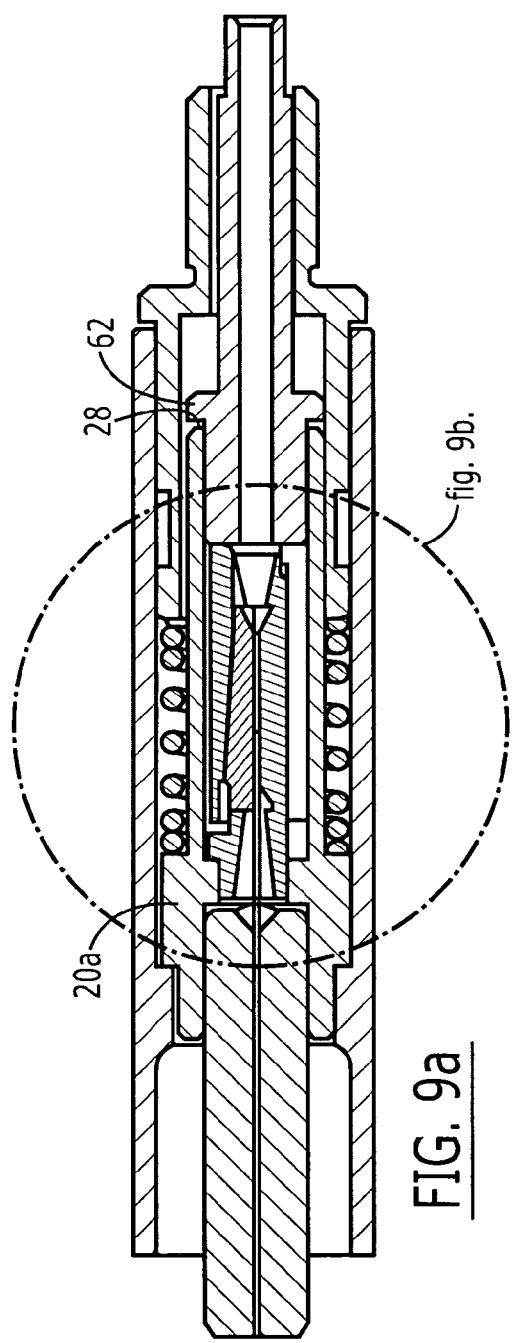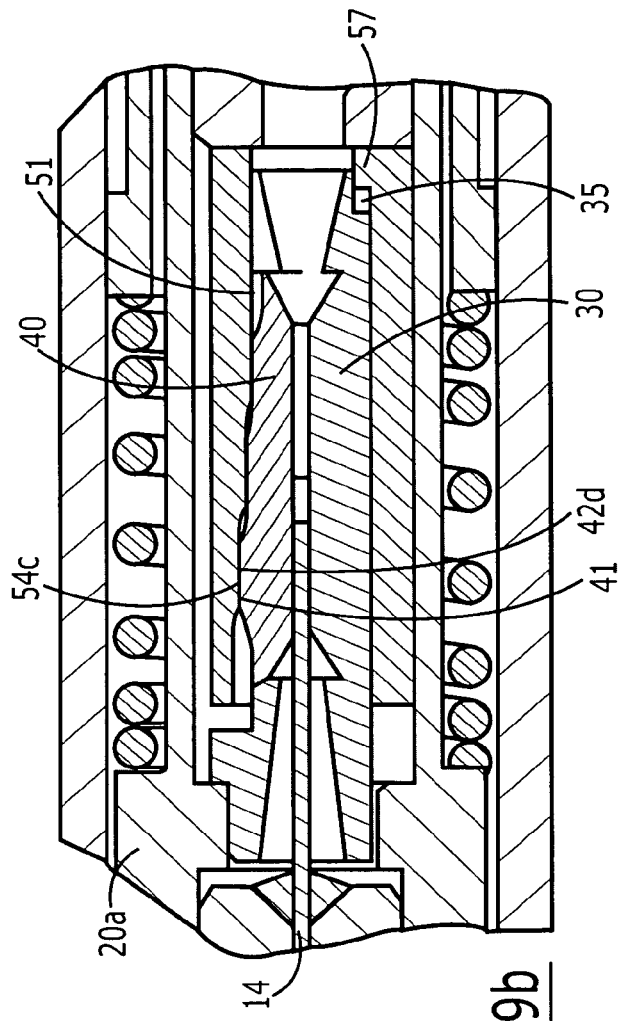
FIG. 9a
FIG. 9b

OPTICAL FIBER CLAMPING ASSEMBLY

FIELD OF INVENTION

This invention relates generally to a fiber clamping assembly, and, more specifically, to a field-installable optical connector having a clamping assembly to secure a fiber to the connector.

BACKGROUND OF INVENTION

Optical fiber connectors are an essential part of practically all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of an optical fiber connector is to optically couple a fiber with the mating device (e.g., another fiber, an active device or a passive device) by holding the end of the fiber such that the core of the fiber is axially aligned with the optical pathway of the mating device.

To effect optical coupling and minimize Fresnel loss, the end of the fiber is commonly presented for mating in a polished ferrule. A polished ferrule assembly is most readily prepared in a controlled setting wherein precision equipment and skilled personnel are available for cleaving the fiber, and terminating it in a ferrule, and polishing the ferrule and fiber to exacting tolerances. However, there is a need for a connector that can be installed in the field where such facilities and personnel are not available. Under these conditions, it is desirable to omit the step of the polishing the ferrule/fiber in the field by instead terminating the fiber in a connector which has a fiber stub already terminated and polished in a ferrule. The terminating fiber is optically coupled to the fiber stub in the connector, often with the use of a refractive index matched gel to improve optical coupling therebetween. The terminating fiber is held in intimate contact with the fiber stub by virtue of a clamping mechanism, which applies a radial force to the terminating fiber to secure it to the connector. Advantageously, this clamping mechanism facilitates straightforward field assembly by obviating the need to handle epoxy and for curing ovens during field termination. Field-installable connectors which have a clamping mechanism are referred to herein as "crimp-type" connectors.

A well-known crimp-type connector is the LightCrimp® connector available through Tyco Electronics (Harrisburg, Pa.) and disclosed in Pat. No. 6,022,150 ('150 patent), which is incorporated herein by reference. Referring to FIG. 10, a longitudinal cross-sectional view of an SC-style connector 100 of the '150 patent is shown. Prior to clamping, this connector receives a terminating fiber in a fiber-receiving passage 118 defined by two clamping members 154, 155. The two clamping members 154, 155 form a clamping insert 112. During actuation, opposing forces are placed on a collar 121 of an axial displacement member 114 and an enlarged collar 139 of ferrule body 103 as shown by force vectors. The opposing forces cause a reaction face 131 of the axial displacement member 114 to engage an end of a sleeve 113. The opposing forces cause the sleeve 113 to telescopically receive the clamping insert 112 and, in so doing, an inner profile of the sleeve 113 engages an outer profile of the clamping insert 112. Cooperating tapers of the inner profile of the sleeve 113 and the outer profile of the clamping insert 112 urge a reduction in the size of the outer profile of the clamping insert 112. The force imposed is sufficient to overcome the mechanical strength of standoffs, which serve to separate the clamping members initially to receive a terminating fiber, and to move the first and second clamping members together to generate a corresponding constriction of a fiber-receiving passage 118 of the clamping insert 112. As the fiber-receiving passage 118 of the first and second clamping members 154, 155 constricts, it places opposing radial forces on the terminating fiber disposed within the fiber-receiving passage 118, thereby securing the terminating fiber to the connector 100.

Although the connector of the '150 patent was revolutionary in many respects and has enjoyed significant commercial success, the applicants have identified a number of factors which contribute to insertion losses from this connector and other similar crimp-type connectors. These losses, in general, relate to the connectors' reliability in aligning and holding fibers accurately without bending or distortion before and during actuation of the clamping mechanism.

Before actuation, the fiber-receiving passageway 118 in the clamping mechanism tends not to be controlled adequately. That is, when the clamping members 154, 155 are inserted in the connector, often a pre-actuation force is applied to engage them and hold them in place. This pre-actuation force, however, can narrow the fiber-receiving passageway 118 excessively such that insertion of the fiber therein becomes difficult or impossible. This difficulty can lead to excessive fiber bending and/or breakage. Conversely, if the clamping members 154, 155 are not pressed together sufficiently during installation, they are not engaged and the space around the fiber-receiving passage 118 can be excessive causing the fiber to leave the fiber-receiving passageway 118, which can cause fiber bending or damage.

During the actuation process, excessive bending can occur in the fiber between the clamping members 154, 155 and the ferrule 102 since the clamping members are necessarily moving during the actuation process. That is, in the prior-art design, both clamping members are designed to cam inward as the sleeve 113 slides past them during the actuation process. Because both clamping members must be free to move inwardly, they cannot be anchored to the ferrule body 103. The allowed movement of the clamping members relative to the ferrule often twists or bends the portion of fiber between the ferrule 102 and the fiber-receiving passageway 118 in the clamping members 154, 155. This bending increases losses and can even break the fiber.

Furthermore, excessive fiber bending can result from excessive actuation force. An improperly maintained crimping tool may apply an excessive amount of clamping force to effect actuation of the clamping mechanism. This force pushes the sleeve 113 forward excessively causing a great deal of force to be transferred to the cramping members 154, 155 as a result of the camming action between the sleeve and the clamping members. This excessive force has been found to push the clamping members forward, even to the point of extruding the clamping members into the passageway 157. Since the ferrule is fixed and the fiber is fixed to the ferrule and the clamping members, pushing the two components together results in the fiber bending, often to the point of breaking.

The problems described above with respect to fiber alignment before and during actuation are exasperated by the fact that the prior art connector has a number of radial cam surfaces and other curved control surfaces which are exceedingly difficult not only to manufacture, but also to measure to ensure compliance with tolerance limits. In particular, the clamping members and the sleeve comprise radial surfaces which are difficult to machine consistently to ensure reliability. Variations in tolerances tend to accumulate which negatively impact the alignment of the fiber before, during and even after the actuation of the clamping assembly.

Therefore, the applicants have identified a need to improve the alignment of the fiber before, during, and after actuation of the clamping assembly to improve its insertion losses. The present invention fulfills this need among others.

SUMMARY OF INVENTION

The present invention overcomes the problems of prior art crimp-type connectors by providing for a clamping assembly having a sturdy substrate on which the fiber is clamped and held securely in alignment before, during, and after actuation of the clamping assembly. Specifically, rather than having the fiber clamped between two radially actuateable members, as in the prior art, the clamping assembly of the present invention uses just a single radially-moving member to clamp the fiber to a stable, stationary platform. This platform is anchored to the housing and is restricted from moving either radially or axially not only after the clamping assembly is actuated, but also before and during the clamping process in contrast to the prior art. By maintaining the stability of the platform before and during actuation, the configuration of the connector of the present invention offers a number of features which enhance the alignment of the fiber and, thus, lower insertion loss.

Prior to actuation, the stable platform ensures a reliable and well-defined channel to receive the fiber. Since the channel is defined in a stationary platform, it is not subject to movement and variations in position prior to actuation which can make fiber insertion difficult if not impossible. Furthermore, since the platform is located in a precise and predetermined position, other clamping assembly components may be offset from the platform at a predetermined location to provide proper access to the channel. For example, the radially moving member which clamps the fiber to the platform may by urged away from the platform initially to provide unencumbered access to the fiber-receiving channel. In this way, the fiber-receiving channel has sufficient space for receiving the fiber but not excessive space such that the fiber is able to escape from the fiber-receiving channel.

During actuation, the radial clamping movement is restricted to just one component, while the platform remains stationary. Since the platform remains stationary, the fiber contained in it also remains stationary relative to the connector during actuation. This is important since the section of fiber between the ferrule and the clamping assembly is fixed at both ends and any movement of the platform during actuation would necessarily cause this section to bend or twist.

The platform is also configured to be robust and resist movement during actuation. In a preferred embodiment, the platform is unitary and has end portions which are received in stable structures of the clamping assembly. This way, the platform is essentially anchored to the housing and is capable of withstanding a high degree of axial and radial force imparted on it through the actuation of the clamping assembly. Again, the ability of the platform to remain stationary is critical since any movement, particularly axial movement, of the fiber-holding components of the clamping assembly will necessarily bend and compromise the fiber portion contained therein.

Additionally, in a preferred embodiment, during actuation, the camming action of the clamping assembly is moderated to limit the axial force translated to the platform. That is, rather than maintaining the same camming action throughout the entire actuation, a point is reached during actuation in which the axial force of the actuating member is not translated into radial and axial force into the platform. This limits the stress to which the platform and the camming member are subjected.

Furthermore, since the platform is not involved in any radial camming action, the need for tapered surfaces on the platform is eliminated. Eliminating the need for tapered surfaces on the platform consequently eliminates the need for tapering the surfaces which come in contact with the platform. The result is a simplified connector having fewer tapered surfaces and moving parts. By using fewer moving parts, the clamping assembly of the present invention also lends itself to miniaturization. Indeed, it has been found that the same clamping assembly can be used from a number of different connector types including, for example, standard connectors such as the SC connector as well as small-form factor connectors such as the LC and MU connectors. Having one clamping assembly that can be used for a variety of different connectors reduces inventory requirements and simplifies manufacturing, thereby resulting in significant cost reductions.

In addition to reducing the number of tapered surfaces and moving parts, the preferred configuration also reduces the interaction of radiused surfaces and relies instead on planar surfaces to register many of the components within the connecter assembly. This configuration simplifies manufacturing and improves consistency of the manufactured product. Furthermore, planar surfaces are more readily checked for compliance to tolerance standards and, thus, lend themselves to improved quality control. It has also been found that planar surfaces are preferred in camming actions by providing a larger contact area. A larger contact area tends to improve control in the camming process and to dissipate forces over a greater area which is beneficial in reducing stress points within the connector.

Therefore, the present invention provides for a field-installable fiber clamping assembly which is easily manufactured and suitable for miniaturization, and which accepts and terminates the fiber reliably without excessive deformation or breakage.

Accordingly, one aspect of the invention is a clamping assembly having a stable platform for receiving and aligning the fiber. In a preferred embodiment, the clamping assembly comprises: (a) a housing; (b) a platform disposed in the housing and being fixed therein both radially and axially, the platform defining a fiber-receiving channel along an optical axis of the clamping assembly to receive at least one fiber, at least a portion of the fiber-receiving channel being accessible from the top; (c) a first cam member disposed in the housing above and adjacent to the fiber-receiving channel, the first cam member being radially actuateable within the housing, the first cam member having a first cam surface; (d) a second cam member disposed in the housing and axially slidable therein, the second cam member having a second cam surface adjacent the first cam surface and configured such that, upon forward motion of the second cam member relative to the first cam member, the first cam member is urged downward as a result of a camming action between the first and second cam surfaces; and (e) an actuator disposed slidably within the housing behind and adjacent to the second cam member and configured, such that, when moved forward, it forces the second cam member forward relative to the first cam member.

Another aspect for the invention is a connector comprising the clamping assembly described above. In a preferred embodiment, the connector comprises: (a) an connector housing; (b) a ferrule projecting from the front of the connector housing and having at least one passage along the optical axis to receive a fiber; (c) a clamping assembly behind the ferrule, the clamping assembly comprising at least: (i) a housing; (ii) a platform disposed in the housing and being fixed therein both radially and axially, the platform defining a fiber-receiving channel along the optical axis to receive at least one fiber, at least a portion of the fiber-receiving channel being accessible from the top; (iii) a first cam member disposed in the housing above and adjacent to the fiber-receiving channel, the first cam member being radially actuateable within the housing, the first cam member having a first cam surface; (iv) a second cam member disposed in the housing and axially slidable therein, the second cam member having a second cam surface adjacent the first cam surface and configured such that, upon forward motion of the second cam member relative to the first cam member, the first cam member is urged downward as a result of a camming action between the first and second cam surfaces; and (v) an actuator disposed slidably within the housing behind and adjacent to the second cam member and configured, such that, when moved forward, it forces the second cam member forward relative to the first cam member; (d) a spring in the housing to bias the combination of the ferrule and the clamping assembly forward relative to the connector housing, and (e) a rear housing to block the back end of the connector housing and contain the ferrule, clamping assembly and spring in the connector housing.

Yet another aspect of the invention is a method of clamping a fiber to a structure, such as a connector, using the clamping assembly described above. In a preferred embodiment, the method comprises (a) providing a terminating fiber with a bare end; (b) disposing the terminating fiber in a fiber-receiving channel defined on a stationary platform within the connector; and (c) actuating the clamping assembly to move forward a second cam member relative to a first cam member, the cam members having cam surfaces which cooperate to translate at least a portion of the axial force of the second cam member to radial force on the first cam member, thereby causing the first cam member to move radially inwardly toward the fiber-receiving channel to urge the terminating fiber contained therein against the stationary platform.

BRIEF DESCRIPTION OF DRAWINGS

FIGS. 2a and 2b show perspective and an axial cross-sectional views of the housing of the clamping assembly shown in FIGS. 1a and 1b. the clamping assembly shown in FIGS. 1a and 1b.

FIGS. 4a and 4b show perspective and axial cross-sectional views of the first cam member of the clamping assembly shown in FIGS. 1a and 1b.

FIG. 8a shows an axial cross-sectional view of the SC-type connector shown in FIG. 1a, fully assembled and in a pre-actuation position.

FIG. 8b shows a detailed section of the clamping assembly of FIG. 8a.

FIG. 9a shows an axial cross-sectional view of the SC-type connector shown in FIG. 1a, fully assembled and in a post-actuation position.

FIG. 9b shows a detailed section of the clamping assembly of FIG. 9a.

DETAILED DESCRIPTION OF PREFERRED EMBODIMENT

Figure 1A:
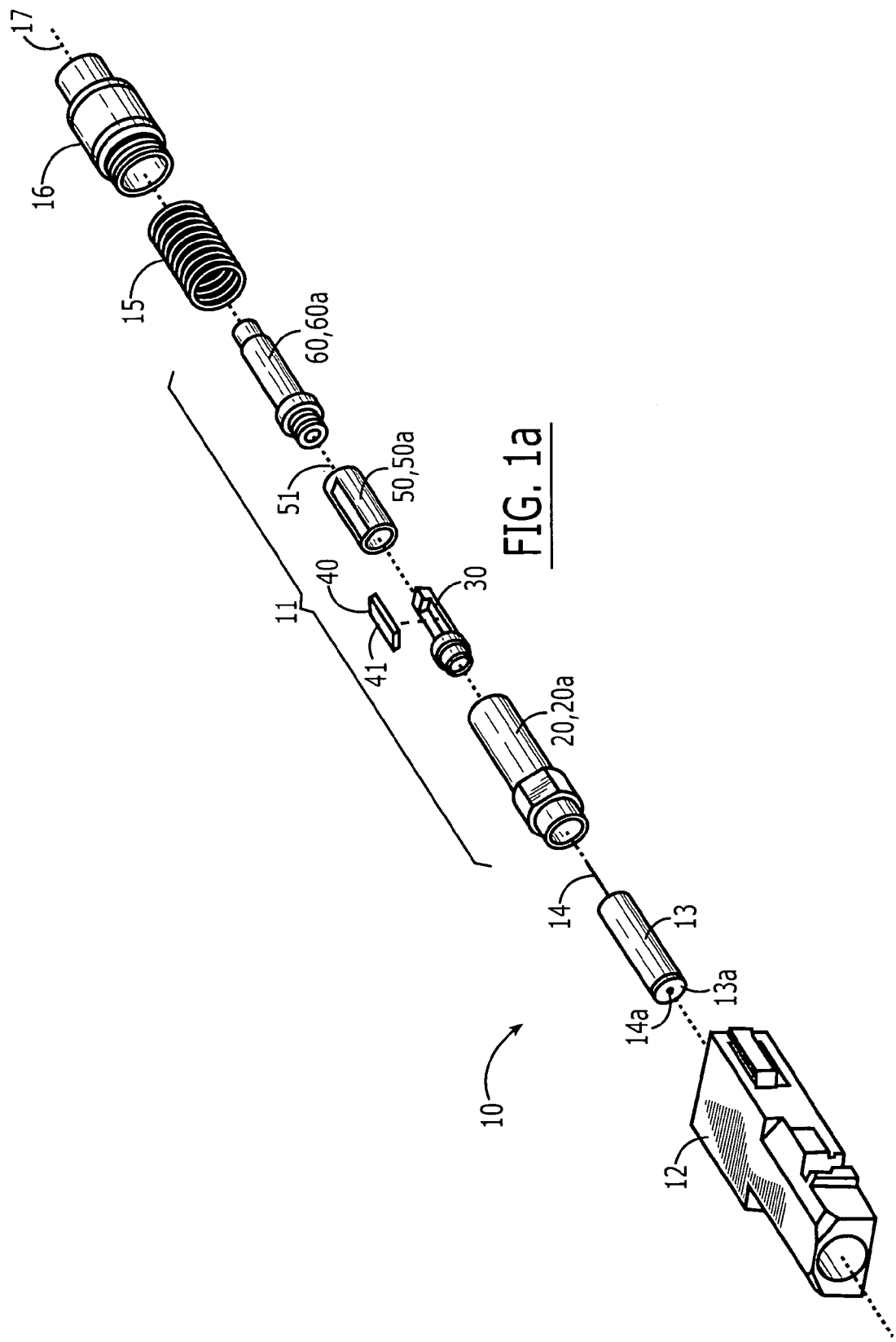
FIGS. 1a and 1b show exploded views of an SC-type connector and an LC-type connector, respectively, having the clamping assembly of the present invention.
Figure 1B:
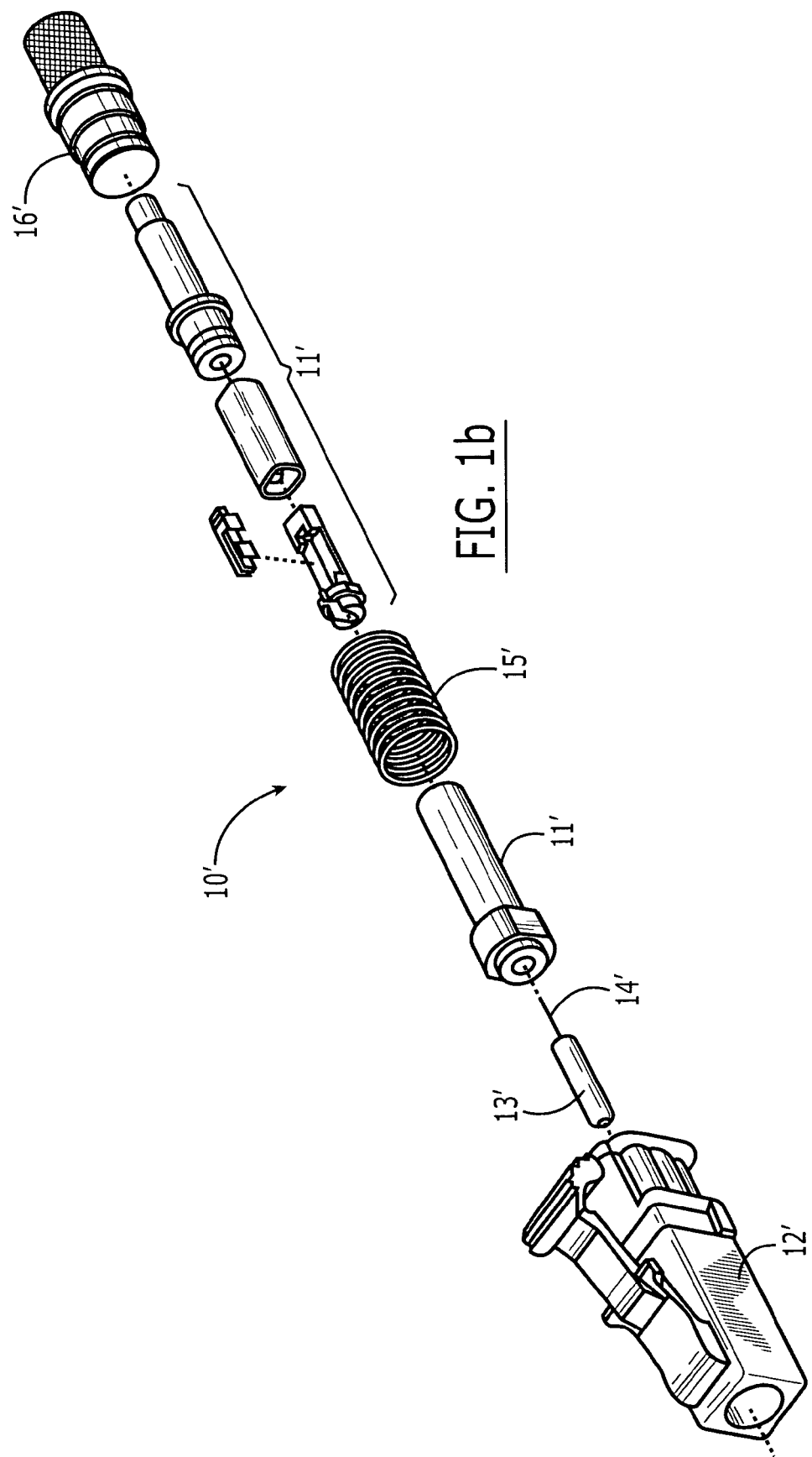

Referring to FIGS. 1a and 1b, preferred embodiments of an SC-type connector 10 and of an LC-type connector 10' comprising the clamping assembly 11, 11' of the present invention are shown, respectively, in exploded views. It should be understood that the present invention is not limited to an SC- and LC-type connectors and may be practiced in any conventional or later-developed connector, including, for example, traditional ST and FC-type connectors, plus small form factor designs, such as, MU, MTRJ, MPX, and MPO-type connectors. Furthermore, the clamping assembly of the present invention is not limited to connector applications and may be used in any optical application requiring a fiber to be secured to a structure. For example, the clamping assembly may be used as a splicing device to optically couple two fibers or it may be incorporated into an active device, such as a transceiver, or a passive device, such as a multiplexer, to optically couple a fiber to the device. For purposes of simplicity, however, the description herein will focus mainly on the clamping assembly as used in a connector.

The connector 10, 10' and clamping assembly 11, 11' are described herein with respect to a top/bottom and front/back orientation. It should be understood that reference is made to this orientation for purposes of illustration and to describe the relative position of the components within a given connector. It should be therefore understood that this orientation is not an absolute orientation and that rotating, inverting or otherwise altering the connector's position in space is possible without changing the relative position of the components of the connector. Additionally, the connector 10, 10' has at least one optical axis 17, 17'. The optical axis 17, 17' corresponds to the axis along which light propagates in the terminated connector. It should be understood that the connector may have more than one optical axis if the connector is used to couple more than one fiber. For purposes of simplicity, however, the connector of the present invention will be described herein only with respect to a single optical axis.

The connector 10, 10' of the present invention is described herein in both its pre-actuated state and post-actuated state. In the pre-actuated state, the clamping assembly has not been actuated so the terminating fiber (not shown) is not secured to the connector. In the post-actuated state, the clamping assembly has been actuated such that the connector is secured to the terminating fiber. As used herein, the terms "fiber" or "terminating fiber" refer to the optical fiber which is inserted into the back of the connector and secured to the connector. As discussed below, this fiber may be clamped in the connector 10, 10' such that its end face is presented in the end face of the ferrule, or, more preferably, it is clamped such that its end face abuts a fiber stub, which, in turn, has an end face presented in the ferrule.

Referring to FIG. 1a, an SC-type connector 10 is disclosed which comprises a connector housing 12, a ferrule 13 projecting from the front of the connector housing, a fiber stub 14 contained in the ferrule and extending from the back of the ferrule, a clamping assembly 11 behind the ferrule 13 into which the back end of the fiber stub extends, a spring 15 in the connector housing 12 to bias the combination of the ferrule 13 and the clamping assembly 11 forward relative to the connector housing 12, and a rear housing 16 to block the back end of the connector housing 12 and contain the ferrule, clamping assembly and spring in the connector housing.

Referring to FIG. 1b, a small-form factor LC-type connector 10' is disclosed which comprises many of the same components described above with respect to the SC-type connector 10. Specifically, the connector 10' comprises a connector housing 12', and a ferrule 13', which, when assembled, projects from the front of the connector housing. The ferrule contains a fiber stub 14' which extends rearwardly therefrom and into a clamping assembly 11' behind the ferrule 13'. The combination of the ferrule 13' and the clamping assembly 11' is urged forward relative to the connector housing 12' by a spring 15'. A rear housing 16' is used to block the back end of the connector housing 12' and contain the ferrule, clamping assembly, and spring in the connector housing. It is worthwhile to mention that, in a preferred embodiment, the clamping assembly 11' in the small-form factor LC connector 10' is identical to the clamping assembly 11 in the SC-type connector 10. This is an important advantage of the present invention as common parts reduce inventory requirements, simplify manufacturing, and therefore decrease overall connector costs.

The connector housings 12 and 12' and ferrules 13 and 13' are not germane to the present invention and will not be discussed in detail. Furthermore, for simplicity, the description address only the single-fiber ferrule, SC-type connector of FIG. 1a in detail.

The ferrule 13 is shown containing a stub fiber 14 which is secured to the ferrule using a traditional adhesive such as epoxy. The end face 14a of a fiber 14 is presented on the front face 13a of the ferrule 13. The fiber stub preferably is affixed and polished in the ferrule in a controlled environment where precise polishing equipment and skilled personnel are available. Although the fiber stub is shown extending from the back of the ferrule for coupling with the terminating fiber in clamping assembly, a much shorter fiber stub may be used which does not protrude from the back end of the ferrule. In such a configuration, the fiber stub would optical couple in the ferrule 13 with a terminating fiber which extends forward from the clamping assembly. In still another embodiment, no fiber stub is used as mentioned above. Furthermore, if the clamping assembly of the present invention is used in a splicing application, a mating fiber, rather than a fiber stub, would meet the terminating fiber in the clamping assembly 11.

The clamping assembly 11 is disposed behind the ferrule. The clamping assembly serves to secure the terminating fiber to the connector such that the fiber cannot be pulled from the connector under ordinary force. To this end, the clamping assembly imparts a radial force upon the fiber to increase the friction between the fiber and the connector. In a preferred embodiment, the clamping assembly clamps a terminating fiber such that the fiber is optically coupled to a stub fiber which has been pre-terminated and polished in the ferrule 13. Alternatively, the clamping assembly clamps a terminating fiber to the connector such that its end is presented at the front face 13a of the ferrule 13 (i.e., no fiber stub is used).

The clamping assembly 11 comprises a housing 20 and a platform 30 disposed in the housing 20 and being fixed therein both radially and axially. The platform 30 defines a fiber-receiving channel 34 along the optical axis 17 to receive at least one fiber. At least a portion of the fiber-receiving channel 34 is accessible from the top. The clamping assembly 11 also comprises first and second cam members 40, 50. The first cam member 40 has a first cam surface 41, and is disposed in the housing 20 above and adjacent to the fiber-receiving channel 34. The first cam member 40 is radially actuateable within the housing 20. The second cam member 50, which is preferably a sleeve 50a, is disposed in the housing 20 and is axially slidable therein. The second cam member 50 has a second cam surface 51 adjacent the first cam surface 41 and configured such that, upon forward motion of the second cam member 50 relative to the first cam member 40, the first cam member 40 is urged downward as a result of a camming action between the first and second cam surfaces, 41, 51. The clamping assembly also comprises an actuator 60 disposed slidably within the housing 20 behind and adjacent to the second first cam member 50. The actuator 60 is configured, such that, when moved forward, it forces the second first cam member 50 forward relative to the first cam member 40. Each of these components is described below in greater detail.

Housing

As shown in FIG. 1a, the housing 20 of the clamping assembly 11 is preferably a capillary base 20a which in adapted to receive a ferrule in its front end. Referring to FIGS. 2a and 2b, the capillary base 20a of FIG. 1a is shown in a perspective view and an axial cross-sectional view, respectively. As with the connector, the capillary base has a top/bottom and front/back orientation with the front of the capillary base being to the left of the page and the top being to the top of the page.

The function of the capillary base 20a is to provide an integrated housing which holds and aligns the ferrule with the clamping assembly along the optical axis 17. The capillary base has a front end 21 defining a first cavity 23 and a back end 22 defining a second cavity 24. Separating the first and second cavities is an intermediate portion 25 which has a front face 25a and a back face 25b and a passageway 26 between the first and second cavities 23, 24. The passageway 26 allows the fiber to pass along the optical axis 17.

The first cavity 23 is configured to receive a ferrule. Accordingly, the first cavity 23 has a radial cross-sectional shape similar to that of the intended ferrule. For example, it may have a circular cross section for a single-fiber ferrule such as those used in the LC, ST, MU and SC connectors, or a rectangular cross section for multi-fiber ferrules such as those used in the MTRJ, the MPX, the MPO, and other MT-type connectors. The ferrule is received in the first cavity 23 such that the back end of the ferrule is proximate to the front face 25a of the intermediate portion 25. The ferrule may be secured to the capillary base using traditional adhesives such as epoxy or by an interference fit between the ferrule and the capillary base.

The back end of the capillary base 20a houses the clamping assembly. Accordingly, the second cavity 24 is adapted to receive the other components of the clamping assembly 11 (described in greater detail below). In the preferred embodiment, the cross section of the second cavity is similar to that of the first cavity.

In a preferred embodiment, the capillary base 20a has an asymmetrical outer surface to provide rotational alignment within the connector housing. An embodiment shown in FIG. 2a, this asymmetrical surface includes a planar surface 27 which registers against a corresponding planar surface in the connector housing so that the capillary base 20a is rotationally oriented within the connector housing.

In a preferred embodiment, capillary base 20a is a unitary component, and, more preferably is machined such that the critical dimensions about the optical axis 17 can be established in a single, relatively simple, step. Preferably, the capillary base is formed using a machining process. The capillary base 20a preferably comprises a machinable material such as aluminum.

In a preferred embodiment, the connector shares several components with the prior art crimp-type connectors such as the LightCrimp® connector. Having components in common with prior-art connectors is preferable since existing molds and assembly equipment can be used to reduce capital and changeover costs.

Referring to FIGS. 3a and 3b, perspective and axial cross-sectional views of the platform 30 are shown, respectively. As with the other components, the platform 30 has a top/bottom and front/back orientation. In FIGS. 3a and 3b, the front of the connector is toward the right of the page and the top is toward the top of the page.

The function of the platform 30 is to provide a stable base within the clamping assembly to hold and align the fiber before, during and after the clamping operation. In a preferred embodiment, the platform 30 is held securely within the capillary base 20a such that radial and axial movement of the fiber-receiving channel 34 is essentially prevented. The platform 30 comprises a substrate portion 33 which provides a sturdy base upon which the fiber will be clamped and held secure in the connector. The substrate portion 33 has a substantially planar substrate surface 33a into which is formed a fiber-receiving channel 34. The fiber-receiving channel provides a pathway along which the fiber runs. In this embodiment, the fiber-receiving channel 34 is a V-groove, although alternative fiber-receiving channel configurations are within the scope of the invention and may include, for example, a U-groove or a channel formed by members extending up from the substrate surface 33a.

Another function of the platform 30 is preferably to provide a platform for mating the fiber stub and the fiber. Specifically, the fiber stub and the fiber preferably are butt jointed at point 34a in fiber-receiving channel 34. It should be obvious that the location of point 34a can be anywhere along the fiber-receiving channel although generally the middle portion is preferred such that the clamping force on the fiber stub and the terminating fiber is approximately the same.

The substrate portion 33 around the fiber-receiving channel should comprise a material which is somewhat compliant to allow for some degree of impression by the fiber during actuation. That is, once the assembly is actuated and the fiber is pressed into the fiber-receiving channel, it is preferred that the material defining the channel deforms slightly around the fiber to increase the surface area contact with the fiber and thereby hold it more securely. Although a compliant material is preferred, it is within the scope of the present invention that other, harder materials may be used depending upon the application. For example, in certain situations, it may be preferable to use a silicon-based material with one or more fiber-receiving channels etched into it. Although silicon tends to be hard and noncompliant, it is capable of being etched with extreme precision. The benefits of this precise etching may outweigh the drawbacks of the silicon's hardness.

The substrate portion 33 also comprises front and back channel lead-in cavities 38a, 38b at the front and back of the fiber-receiving channel 34, respectively. The front channel lead-in cavity 38a serves to guide the fiber stub into the fiber-receiving channel, while the back channel lead-in cavity 38b serves to guide the terminating fiber into the fiber-receiving channel. By guiding the fiber into the fiber-receiving channel, the chance of damaging either the fiber stub or the terminating fiber is reduced.

The platform 30 also comprises top and bottom surfaces 32a and 32b, which are preferably planar surfaces. Planar surfaces are preferred since they are readily machined and easily measured to ensure compliance with specific tolerance limits. As discussed below with respect to FIG. 5, the surfaces 32a and 32b contact corresponding surfaces 51, 52 in the sleeve 50a and slide along the sleeve surfaces during actuation. Aside from enhancing manufactureability, these planar surfaces also facilitate a simple axial motion of the sleeve relative to the platform 30 rather than a more complicated taper arrangement as was used in the prior art.

The top surface 32a of the platform 30 defines an opening 31c at its top to allow access to the fiber-receiving channel 34 from the top. The opening 31c is adapted to receive the first cam member 40 (see FIG. 4). In a preferred embodiment, the platform 30 also comprises a stop-receiving cavity 35 along its bottom surface 32b to receive a corresponding stop 57 of the sleeve 50a (see FIG. 5b). The stop 57 prevents the sleeve 50 from being assembled backwards onto the platform 30.

The platform 30 also comprises front and back end portions 31a, 31b. These end portions serve two primary functions. First, they serve to align and hold the platform 30 such that its fiber-receiving channel 34 is coaxial with the optical axis 17. Second, they provide initial lead-in cavities 39a, 39b into the more-narrow channel lead-in cavities 38a and 38b, respectively, in the substrate portion of the platform 30.

The front portion 31a comprises a protrusion 36 and a flange 37. The protrusion 36 is configured to fit snugly in the passageway 26 of the capillary base 20a. By fitting snugly in the passageway, the protrusion 36 essentially eliminates radial movement of the front end 31a of the platform. The flange 37 cooperates with the intermediate portion 25 of the capillary base 20a such that, when the flange abuts the back face 25b of the intermediate portion 25, the fiber-receiving channel 34 is aligned with the optical axis 17. Therefore, the combination of the protrusion 36 and the flange 37 at the first end 31a of the platform 30 provides alignment of the fiber-receiving channel along the optical axis 17.

The flange 37 also prevents forward axial movement of the platform 30 into the passage 26 during the actuation process. Given the rather significant contact between the flange 37 and the back face 25b of the intermediate portion 25, the likelihood of having the platform 30 extrude into the passage 26 is very remote. Accordingly, by aligning and holding the front portion 31a of the platform and preventing its radial and axial movement, the protrusion 36 and flange 37 serve to reduce bending and distortion and even breakage of a fiber between the platform and the ferrule. This is an important advantage over the prior art in which the clamping members were relatively free to move allowing the portion of fiber between the clamping members and the ferrule to bend often to the point of breaking.

The back portion 31b of the platform 30 is supported by the sleeve 50a. Specifically, the top surface 32a and bottom surface 32b at the back portion 31b contact corresponding surfaces on the sleeve such that the back portion 31b cannot move vertically. Likewise, the sides 32c of the platform 30 contact the sides 52c of the sleeve 50a so that the back portion 31b cannot move horizontally. One skilled in the art will appreciate that the combination of the front portion 31a with its protrusion 36 and flange 37 and the back portion 31b with its top and bottom surfaces 32a and 32b provide stability for the platform 30 before, during and after actuation. By securing both ends of the platform from moving either axially and radially, the fiber-receiving channel 34 remains precisely positioned along the optical axis 17.

In a preferred embodiment, the platform 30 is a unitary structure, and, more preferably, it is integrally molded. By integrally molding the platform 30 all critical dimensions (e.g., the distance between the fiber-receiving channel and each of the protrusion 36, flange 37 and top and bottom planar surfaces 32a and 32b) may be established in a single, relatively-simple, molding step. The platform may comprise any structurally robust material including, for example, a metal, ceramic, or polymeric material. Preferably, the platform comprises a polymeric material, and, more preferably, it comprises Ultem® polyetherimide.

Referring to FIGS. 4a and 4b, a perspective view and an axial cross-sectional view of the first cam member 40 of the connector 10 are shown, respectively. As with the other components of the connector 10, the first cam member as depicted in these drawings has a top/bottom and front/back orientation with the front being toward the right of the page and the top being toward the top as depicted in FIG. 4a, and with the front being toward the left of the page and the top being toward the top as depicted in FIG. 4b.

The first cam member 40 functions as the actuateable component which works in cooperation with the second cam member 50 to translate axial force into radial force and to transfer this radial force to the fiber held in the platform 30 to secure the fiber to the connector 10. To this end, the first cam member 40 comprises a first cam surface 41 and a contact surface 42. The contact surface 42 preferably is a substantially planar surface and moves in a generally parallel fashion with respect to the substrate surface 33a so as to clamp the fiber and hold it in the fiber-receiving channel 34. Again, as with the top and bottom the planar surfaces 32a and 32b of the platform 30, the planar contact surface 42 is readily machined and verified for accuracy. Additionally, since the clamping assembly involves two planar surfaces approaching one another in a parallel fashion, the reliability and precision of this clamping assembly is superior to that of tapered or otherwise non planar contacting surfaces.

In a preferred embodiment, the contact surface 42 defines front and back lead-in cavities 47a, 47b. Lead-in cavity 47a cooperates with lead-in cavity 38a of the platform 30 to guide the fiber into the back of the platform/first cam member assembly, while lead-in cavity 47a cooperates with lead-in cavity 38b to guide the fiber stub into the front of the platform/first cam member assembly.

The first cam surface 41 is inclined upward from the back to the front. In a preferred embodiment, the first cam surface 41 comprises one or more planar surfaces. Planar surfaces are preferred to radial surfaces for a number of reasons. First, as mentioned above, they are more readily manufactured and measured for accuracy. Second, unlike the prior art crimp-type connectors which use radial cam surfaces, planar surfaces use the entire cam surface in the camming action. That is, in the prior art, radial cam surfaces make only line contact. Applicants find that a planar contact is preferred to line contact from the standpoint of dissipating the cam forces and reliability in actuation.

In a preferred embodiment, the first cam surface 41 is stepped, meaning that the slope of the cam surface is not constant. As used herein, the term "slope" refers to the customary ratio of vertical change over horizontal change. In a stepped cam surface, the slope along the cam surface changes from low slope portions, or dwell portions, to relatively high slope portions, or rise portions. In a preferred embodiment, the dwell portions are essentially parallel to the optical axis and, thus, are parallel to the contact surface 42. Having the dwell portion parallel with the contact surface simplifies manufacturing and provides benefits during actuation as described below.

In a preferred embodiment there is a sequence of dwell and rise portions. For example, in a particularly preferred embodiment as shown in FIG. 4b, the cam surface comprises alternating dwell and rise portions 42, 43. Specifically, from back to front, the first cam surface 41 comprises a back dwell portion 42a and a back rise portion 43a, a first intermediate dwell portion 42b and a first intermediate rise portion 43b, a second intermediate dwell portion 42c and a second intermediate rise portion 43c, and finally a front dwell portion 42d. Although two intermediate dwell and rise sequences are shown in FIG. 4b, it should be understood that any number of dwell and rise sequences can be used within the scope of the present invention. The function of these rise and dwell portions and their benefits will be explained in detail below with respect to the sleeve 50a and the operation of the connector 10.

In a preferred embodiment, the first cam member is upwardly biased from the platform 30. Such a configuration provides access for introducing a fiber into the fiber-receiving channel either from the front end in the case of the fiber stub or from the back end in the case of the terminating fiber. The first cam member is elevated above the substrate surface 33a so that access along the fiber-receiving channel 34 is not encumbered. In a preferred embodiment, the first cam member is urged upward but not so far that excessive space is left between the substrate surface 33a and the contact surface 42 to allow the fiber to escape from the fiber-receiving channel 34 and move unconstrained on the substrate surface. To this end, the first cam surface 41 of the first cam member and the second cam surface 51 of the sleeve 50a are configured to contact and limit the upward travel of the first cam member 40 relative to the platform 30.

The means 46 for urging the first cam member upward relative to the platform 30 can vary. FIG. 4a depicts a preferred embodiment of the means 46 for urging the first cam member upward in which resilient members 46a extend down from the first cam member slightly below the contact surface 42. These resilient members 46a contact the substrate surface 33a and lift the first cam member such that the contact surface 42 is held away from the substrate surface 33a thereby creating space above the fiber-receiving channel. Being resilient, these members are readily deformed as the first cam member 40 is pushed down through the camming action of the first and second cam surfaces.

Figure 7:
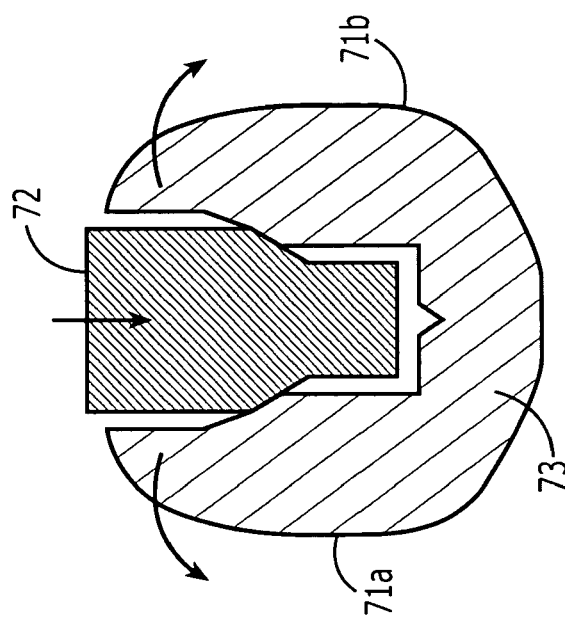
FIG. 7a show a schematic of resilient side portions extending up from the platform to urge the first cam member upward.

Although resilient members 46a are preferred, other configurations of the urging means are within the scope of the invention. For example, an alternative urging means may involve resilient members extending from the ends of the first cam member rather than from the sides. In yet another alternative, the urging means between the first cam member 40 and the platform 30 may be a living spring between the two components. That is, rather than having two distinct components as in the connector 10 described herein, the first cam member and the platform may be of a unitary design wherein the first cam member is attached to the platform via one or more resilient tabs. Yet another alternative involves compliant portions of the platform extending upward to urge the first cam member upward. For example, referring to FIG. 7a, a schematic is shown in which resilient side portions 71a and 71b extend up from the substrate portion 73 of the platform 70. Resilient side member 71a and 71b hold the first cam member 72 above the fiber-receiving channel at the appropriate height. Once the first cam member is forced down through the camming force, the resilient side member 71a and 71b deform or move outwardly to allow the first cam member to be pressed toward the substrate surface and fiber-receiving channel.

Since the principal function of the first cam member is to translate axial force to radial force and to apply that force to the fiber, the first cam member should be formed of a fairly compliant material that deforms and stores elastic energy to maintain contact with the fiber over a relatively large temperature range so as to absorb such forces. The first cam member may comprise any structurally robust material including, for example, a metal, ceramic, or polymeric material. Preferably, the first cam member comprises a polymeric material, and, more preferably, it comprises Ultem® polyetherimide.

Figure 5B:
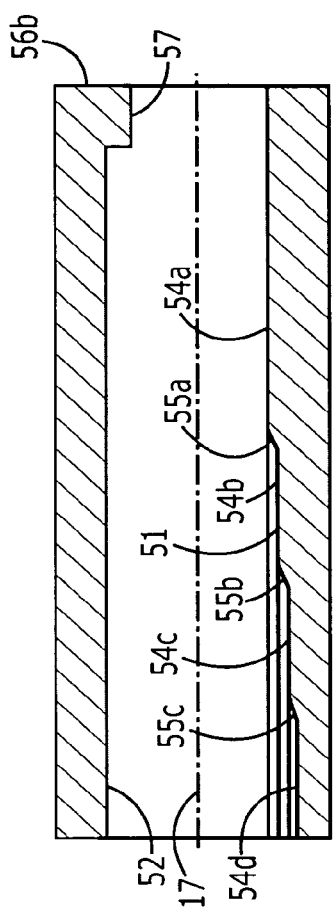
FIGS. 5a through 5c show perspective and axial horizontal and vertical cross-sectional views of the second cam member of the clamping assembly shown in FIGS. 1a and 1b.
Figure 5C:
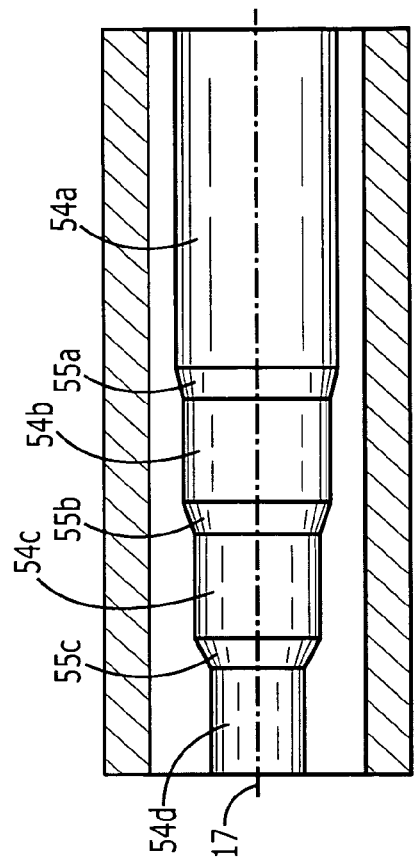
Figure 5A:
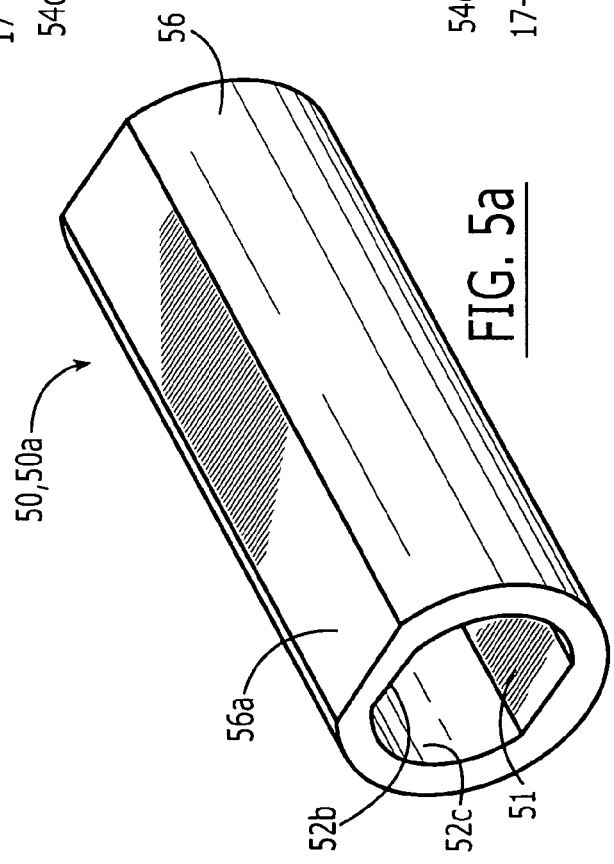

Referring to FIGS. 5a through 5c, the second cam member 50 is shown in its preferred embodiment as a sleeve 50a in a perspective view, an axial vertical cross-sectional view, and an axial horizontal cross-sectional view, respectively. As with the other components, the sleeve has a top/bottom and front/back orientation. As shown in FIGS. 5(a)-5(c) the front is toward the left of the page and the top is toward the bottom of the page. The sleeve 50a has two primary functions. First, it acts as a complementary camming component to the first cam member 40 to translate axial force into radial force and thereby crimp the fiber to the platform. Second, in a preferred embodiment, the sleeve acts as a back stop to prevent the platform 30 from moving radially as a result of the first cam member applying radial force to the fiber contained in the fiber-receiving channel 34 of the platform 30.

The sleeve has an outer surface 56 which is designed to fit snugly within the second cavity. Preferably, the outer surface 56, has a planar portion 56a. The planar portion 56a serves to provide tolerance both between the sleeve and the second cavity and thereby allow the sleeve to slide within the cavity. Additionally, the planar portion 56a provides a register surface upon which the other planar surfaces (e.g., the second cam surface 51 and the bottom surface back rise) can be based. The outer surface 56 also comprises a back face 56b. The back face 56b provides a surface upon which the actuator 60 contacts to apply axial force to the sleeve to move it forward.

The interior of the sleeve 50a comprises a second cam surface 51 and a bottom surface 52. The second cam surface 51 is configured to complement the first cam surface 41, and, thus, is inclined from the back to the front like the first cam surface. As used herein, the terms "compliment" or "complimentary" in the context of cam surfaces refers to a substantial matching of inclines between cam surfaces so that the axial motion of one cam surface relative to the other results in radial force between the surfaces. Accordingly, the second cam surface 51 preferably comprises one or more planar surfaces, and even more preferably, comprises a stepped inclined surface similar to that described with respect to the first cam surface 41. Specifically, the stepped inclined surface comprises a number of alternating dwell and rise portions. Referring to FIGS. 5b and 5c, from back to front, the second cam surface 51 comprises a back dwell portion 54a and a back rise portion 55a, a first intermediate dwell portion 54b and a first intermediate rise portion 55b, a second intermediate dwell portion 54c and a second intermediate rise portion 55c, and finally a front dwell portion 54d. Preferably, dwell surfaces 54a, 54b, 54c and 54d are essentially parallel to the optical axis.

The first and second cam surfaces 41, 51 cooperate such that there is only a camming action in which axial motion of the sleeve is translated into radial motion of the first cam member when a rise portion meets a corresponding rise portion. Conversely, when a rise portion is not sliding against a rise portion and only dwell portions are in contact, there is no camming action since the dwell portions are parallel to the optical axis in the preferred embodiment. Rather, the dwell portions simply slide over one another so there is little if any force transferred from the sleeve to the first cam member, and, in turn, to the platform. This is a significant feature of the preferred embodiment since it limits the amount of axial force that can be applied to the platform 30 and, thereby, avoids the problems of over actuating the connector and bending or breaking the fiber contained in the connector.

The bottom surface 51b is profiled to receive the bottom portion of the holder during actuation and thereby act as a back stop against the radial force applied to the platform 30 as a result of the first and second cam surfaces sliding over one another. Alternatively, rather than acting as a backstop for the platform, the clamping assembly 11 could be configured to allow the housing 20 to act as the backstop. For example, the sleeve may have a U-shape cross section and may coordinate with the platform such that the bottom surface of the platform would be at the opening of the "U" and in contact with the inner surface of the housing. This way, the capillary base would act as the backstop to resist the radial force being imparted to the platform from the first cam member.

Preferably, bottom surface back rise is a planar surface. As mentioned above, planar surfaces are more readily manufactured and verified as being within tolerance. The bottom surface back rise preferably comprises a stop 57 to polarize the sleeve and prevent it from being inserted backwards in the capillary base 20a. Upon full actuation of the sleeve, at least a portion of the stop 57 is received in the corresponding stop-receiving cavity 35 of the platform 30.

Figure 6B:
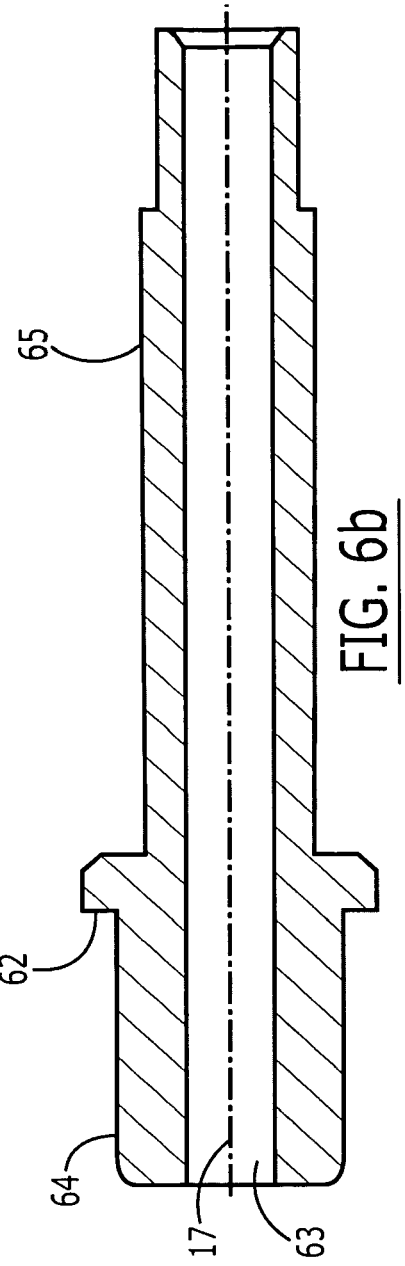
FIGS. 6a and 6b show perspective and axial cross-sectional views of the actuator of the clamping assembly shown in FIGS. 1a and 1b.
Figure 6A:
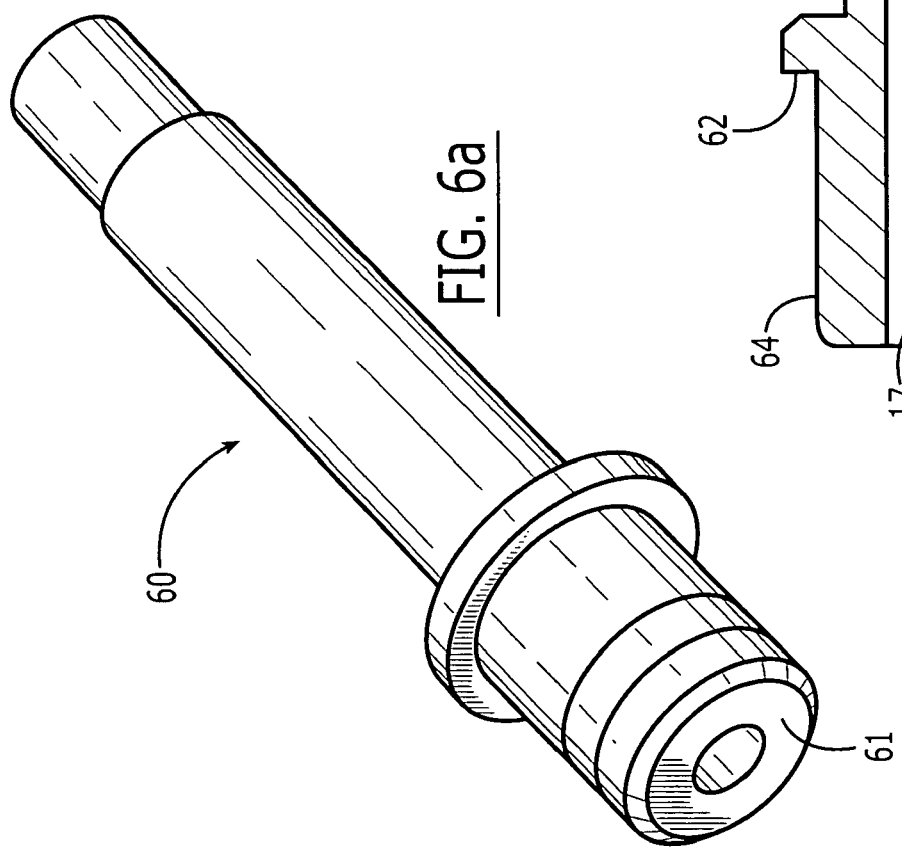
Figure 10:
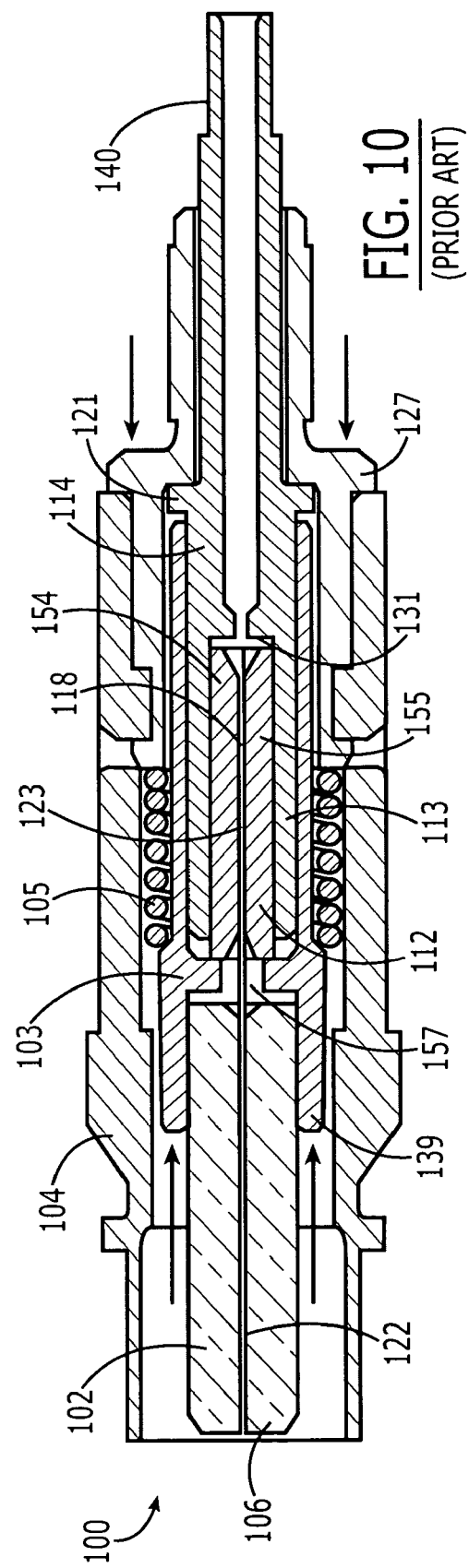
FIG. 10 shows a prior art crimp-type connector for an SC-type connector.

Referring to FIGS. 6a and 6b, a perspective view and axial cross-sectional view of the actuator 60 are shown. The actuator has a front and back orientation, and, as shown in FIGS. 6a and 6b, the front is toward the left of the page.

The function of the actuator 60 is to provide a readily-engageable surface for the user to engage with a clamping tool and then to transfer the force applied by the clamping tool as an axial force to the second cam member to effect the clamping operation. In the preferred embodiment, the actuator 60 is an elongated plunger 60a comprising a front end 64 and a back end 65. The front end 64 comprises a front face 61 which is configured to urge against the back face 56b of the sleeve 50a during the actuation process. The back end 65 protrudes from the connector housing 12 and is crimped onto the buffer of the optical fiber (not shown) to provide additional fiber retention. The plunger also comprises a passage 63 which runs along the optical axis and provides for the passage of a buffered section of fiber. The plunger 60a also comprises a flange 62. The flange is configured to contact the back face 28 of the capillary base 20a (see FIG. 2) once actuation is complete. This feature along with the other stops described above prevent the over actuation of the clamping assembly, thereby avoiding damage often associated with such over actuation.

In a preferred embodiment, the plunger 60a is the same plunger as used in prior art crimp-type connectors, such as the LightCrimp® connector. Having components in common with prior-art connectors is preferable since existing molds and assembly equipment can be used to reduce capital and changeover costs.

Although the actuator is described herein as a discrete plunger, it should be understood that it is within the scope of the present invention that the actuator and the second cam member may be embodied in a single unitary component. Further, this unitary component may be integrally molded to effect all critical alignments in a single manufacturing step.

The operation of the connector 10 and the interplay of the various components will now be discussed with respect to the pre-actuated assembled connector 10 depicted in FIGS. 8a, 8b, and the post-actuated assembled connector 10 depicted in FIGS. 9a and 9b. FIG. 8a shows an axial cross-sectional view of the connector 10, fully assembled and in a pre-actuation position, while FIG. 8b, shows a detailed section of the clamping assembly of FIG. 8a. In this position, the platform 30 is prevented from moving forward by virtue of the flange 37 against the back face 25b of the intermediate portion 25. The front portion 31a of the platform 30 is prevented from moving radially by virtue of the protrusion 36 being fit snugly into the passageway 26 in the front end. Likewise, the back end 31b is disposed snugly within the sleeve 50a the top surface 32a—of the platform contacts the back dwell portion 54a of second cam surface 51 the sleeve 50a, while the bottom surface 32b of the platform contacts the bottom surface 52 of the sleeve. Hence, the platform cannot move vertically. Along the interface of the sleeve 50a and the platform 30, the curved sides 32c of the platform (see FIG. 3) contact the corresponding curved side walls 52c of the sleeve 50a (see FIG. 5) to prevent the platform from moving in horizontally.

The plunger 60a is behind the sleeve such that its forward face 61 is in contact with the back face 56b of the sleeve. The plunger 60a extends out behind the back of the connector 10 and provides a tubular section that is crimped onto the buffer (coating) of the optical fiber. In the preferred embodiment the crimped section is hexagonal in cross section. Other cross sectional shapes could be used, for example, circular or octagonal.

To facilitate insertion of the terminating fiber (not shown) in the fiber-receiving channel 34 of the platform, the first cam member 40 is urged upward from the platform 30 such that the first cam surface 41 of the first cam member 40 contacts the second cam surface 51 of the sleeve 50a. By urging the first cam member upwardly from the platform access is provided to fiber-receiving channel 34. The sleeve 50a is axially disposed with respect to the first cam member 40 such that, when the first cam member 40 is urged upward, the first and second cam surfaces 41, 51 meet so that the back dwell portions, first intermediate dwell portions, second intermediate dwell portions, and end dwell portions of the first and second cam surfaces 41, 51 contact, respectively. This particular contact between the first and second cam surfaces allows the first cam member to be urged upward but to a limited extent. That is, the first cam member is not raised relative to the substrate surface such that an excess amount of space is created above the fiber-receiving channel such that the fiber is free to escape from the fiber-receiving channel. Rather, the first cam member is raised so that the space between the contact surface and the substrate surface is high enough to provide access through the fiber-receiving channel but small enough to contain the fiber in the fiber-receiving channel. In a preferred embodiment, the space between the contact surface and the substrate surface in the pre-actuated position is less than the diameter of the bare fiber.

Further facilitating insertion of the terminating fiber in the fiber-receiving channel 34 are the back channel lead-in cavities, formed by the combination of the platform back lead-in cavity 38b and the first cam member back channel lead-in cavity 47b, and the initial back lead-in cavity 39b formed by the back portion 31b of the platform. In the pre-actuation state, the combination of the upwardly urging first cam member, the particular contact between the first and second cam surfaces, and the initial and channel lead-ins, facilitates the simple insertion of the terminating fiber in the connector 10.

The terminating fiber (not shown) is prepared by removing the buffer from the bare fiber and cleaving the end to produce a smooth low loss facet to optically couple with another fiber. This is a well known process. Next, the terminating fiber, with bare fiber exposed at the end, is inserted into the back of the connector 10. The fiber passes initially though the passage 63 of the plunger 60 before the fiber end is introduced into the initial back lead-in cavity 39b of the back portion of the platform. The initial back lead-in cavity 39b funnels the fiber into the channel lead-in cavity (defined by cavities 38b, 47b) which, in turn, funnels the fiber into the fiber-receiving channel 34.

In a preferred embodiment, the bare fiber is pushed along the fiber-receiving channel until it contacts the back end face of the fiber stub at a median point 34a between the front and back ends of the fiber-receiving channel 34. Alternatively, in embodiments in which the optical coupling with the fiber stub occurs in the ferrule, the fiber is pushed through the entire length of the fiber-receiving channel and into the ferrule. In embodiments in which there is no fiber stub used at all, the fiber is pushed through the ferrule to the ferrule end face wherein the end of the fiber is positioned to be parallel to the end face of the ferrule.

Once the fiber is correctly situated in the connector 10, the clamping assembly is actuated to hold the fiber in that position. To that end, connector 10 is placed in a clamping tool (not shown) such that a first portion of the clamping tool contacts a front face 29 on the capillary base 20a, and a second portion of the clamping tool contacts the back face 16a of the rear housing 16. Actuation of the tool results in first and second portions moving toward each other which thereby causes the forward movement of the rear housing 16 relative to the capillary base 20a. This relative motion causes the forward motion of the plunger and thus the sleeve 50a relative to the first cam member 40, thereby causing a camming action between the first and second cam surfaces 41, 51 so that the first cam member 40 is urged downward into the stationary platform 30 to thereby effect the clamping of the terminating fiber to the platform.

The post-actuation state of the connector is described herein with reference to FIG. 9a and FIG. 9b which shows the clamping assembly of FIG. 9a in detail. The post-actuation state of the connector is characterized by one or more conditions. For example, the flange 62 meets or is close to the back end 28 of the capillary base 20a. The sleeve is moved forward relative to the platform to the extent that stop 57 is received in the stop-receiving cavity 35. Additionally, the cam surfaces are moved axially relative to one another such that the final dwell portion 42d of the first cam surface 41 comes in contact with the second intermediate dwell portion 54c of the sleeve 20a. It should be understood that while the dwell portions of the first and second cam surfaces are in contact, axial movement of the second cam member relative to the first cam member will have little effect on the first cam member. Thus, during the contact of the dwell surfaces, there is very little force transferred from the sleeve 20a into the first cam member/platform assembly and thus into the connector 10 itself. This is an important advantage over the prior art in which excessive axial forces often resulted in the clamping members being extruded into the passageway of the capillary base thereby resulting in fiber bending and/or breakage.

After actuation, the terminating fiber is held securely in place by the clamping force between the platform 30 and the first cam member 40. This force is sufficient to prevent the terminating fiber from being extracted from the terminator 10 under normal forces. Additionally, if a fiber stub 14 is used, this clamping force will also serve to hold the fiber stub secure in the platform abutting the terminating fiber so as to achieve an efficient optical coupling between the two.

Thus, the clamping assembly of the present invention provides for a relatively simple-to-manufacture connector system which is robust and tolerant of variations in terminating styles and techniques in the field which have previously led to fiber bending and/or breakage in prior art connector systems.

What is claimed is:

1. A clamping assembly having a top and bottom and front and back orientation, at least one optical axis, and a pre-actuated state in which a fiber is not secured to said clamping assembly and a post-actuated state in which a fiber is secured to said clamping assembly, said clamping assembly comprising:
   a housing;
   a platform disposed in said housing and being fixed therein both radially and axially, said platform defining a fiber-receiving channel along said optical axis to receive at least one fiber, at least a portion of said fiber-receiving channel being accessible from said top;
   a first cam member disposed in said housing above and adjacent to said fiber-receiving channel, said first cam member being radially actuateable within said housing, said first cam member having a first cam surface;
   a second cam member disposed in said housing and axially slidable therein, said second cam member having a second cam surface adjacent said first cam surface and configured such that, upon forward motion of said second cam member relative to said first cam member, said first cam member is urged downward as a result of a camming action between said first and second cam surfaces; and
   an actuator disposed slidably within said housing behind and adjacent to said second cam member and configured, such that, when moved forward, it forces said second cam member forward relative to said first cam member.

2. The clamping assembly of claim 1, wherein said housing is an elongated capillary base defining a first cavity at said front end, a second cavity at said back end, and a passageway along said optical axis between said first and second cavities.

3. The clamping assembly of claim 2, further comprising a ferrule disposed in said first cavity, said ferrule having at least one passage along said optical axis to receive a fiber.

4. The clamping assembly of claim 3, further comprising a fiber stub in said ferrule.

5. The clamping assembly of claim 4, wherein said fiber stub extends from the back of the ferrule into said fiber-receiving channel.

6. The clamping assembly of claim 1, wherein said holder has front portion comprising a flange and a protrusion disposed snugly in said passageway such that radial movement of said protrusion in said passageway is essentially eliminated, said flange registering against said intermediate portion to hold said holder relative to said capillary base such that said fiber-receiving channel is essentially coaxial to said optical axis.

7. The clamping assembly of claim 1, wherein said front portion extends upward from said substrate portion beyond said fiber-receiving channel.

8. The clamping assembly of claim 1, wherein said second cam member is a sleeve being disposed around the back end of said platform, and wherein said holder has a back portion having a radial cross section to fit snugly in said sleeve such that radial movement of said back portion in said sleeve is essentially eliminated.

9. The clamping assembly of claim 1, wherein said substrate portion has an essentially planar substrate surface in which said fiber-receiving channel is defined.

10. The clamping assembly of claim 1, wherein said fiber-receiving channel is a V-groove.

11. The clamping assembly of claim 1, wherein the top and bottom surfaces of platform are planar.

12. The clamping assembly of claim 1, wherein said platform is integrally molded.

13. The clamping assembly of claim 1, wherein said first cam member is actuated in an up and down direction.

14. The clamping assembly of claim 1, wherein said first cam member is held to prevent axial movement.

15. The clamping assembly of claim 1, wherein said first and second cam surfaces comprise one or more planar surfaces.

16. The clamping assembly of claim 1, wherein said first and second cam surfaces are not tapered.

17. The clamping assembly of claim 1, wherein said first and second cam surfaces are stepped and have a series of dwell and rise portions, in which each rise portion has a slope greater than said dwell portion.

18. The clamping assembly of claim 1, wherein said first and second cam surfaces comprise, from back to front, a back dwell portion and a back rise portion, at least one intermediate dwell portion and at least intermediate rise portion, and a front dwell portion.

19. The clamping assembly of claim 1, wherein said back dwell portions of said sleeve and cam member contact in said pre-actuated state, and said back dwell portion of said first cam member contacts said at least one intermediate dwell portion of said sleeve in said post-actuated state.

20. The clamping assembly of claim 1, wherein said dwell portions are parallel to said optical axis.

21. The clamping assembly of claim 1, wherein said first cam member is upwardly biased from said platform to provide clearance between said fiber-receiving channel and the bottom of said first cam member to allow access for said fiber.

22. The clamping assembly of claim 1, wherein said first cam member has resilient members extending from it which urge against said holder to provide said first cam member with its upward bias.

23. The clamping assembly of claim 1, wherein said resilient members extend downwardly from the sides of said first cam member.

24. The clamping assembly of claim 1, wherein said first cam member is upwardly biased such that the first cam surface contacts said second cam surface in said pre-actuated state, thereby limiting the space between the bottom of said first cam member and said fiber-receiving channel to restrict radial movement of fiber therein such that said fiber cannot escape from said fiber-receiving channel.

25. The clamping assembly of claim 1, wherein said first cam member is biased by resilient members extending up from said holder.

26. The clamping assembly of claim 1, wherein said actuator is a plunger.

27. A connector having a top and bottom and front and back orientation, at least one optical axis, and a pre-actuated state in which a fiber is not secured to the connector and a post-actuated state in which a fiber is secured to said connector, said connector comprising:
- an connector housing;
- a ferrule projecting from the front of the connector housing and having at least one passage along said optical axis to receive a fiber,
- a clamping assembly behind the ferrule, said clamping assembly comprising at least:
  - a housing;
  - a platform disposed in said housing and being fixed therein both radially and axially, said platform defining a fiber-receiving channel along said optical axis to receive at least one fiber, at least a portion of said fiber-receiving channel being accessible from said top;
  - a first cam member disposed in said housing above and adjacent to said fiber-receiving channel, said first cam member being radially actuateable within said housing, said first cam member having a first cam surface;
  - a second cam member disposed in said housing and axially slidable therein, said second cam member having a second cam surface adjacent said first cam surface and configured such that, upon forward motion of said second cam member relative to said first cam member, said first cam member is urged downward as a result of a camming action between said first and second cam surfaces; and
  - an actuator disposed slidably within said housing behind and adjacent to said second cam member and configured, such that, when moved forward, it forces said second cam member forward relative to said first cam member;
- a spring in the housing to bias the combination of the ferrule and the clamping assembly forward relative to the connector housing, and
- a rear housing to block the back end of the connector housing and contain the ferrule, clamping assembly and spring in the connector housing.

28. The connector of claim 27, wherein said housing is a capillary base having a front end, a back end, and defining a first cavity at said front end, a second cavity at said back end, and a passageway along said optical axis between said first and second cavities.

29. The connector of claim 27, further comprising a fiber stub in said ferrule.

30. The connector of claim 27, wherein said fiber stub extends from the back of the ferrule into said clamping assembly.

31. A method of clamping a fiber to a crimp-type connector having a top and bottom and front and back orientation, at least one optical axis, and a pre-actuated state in which a fiber is not secured to the connector and a post-actuated state in which a fiber is secured to said connector, said method comprising:
- providing a terminating fiber with a bare end;
- disposing said terminating fiber in a fiber-receiving channel defined on a stationary platform within said connector; and
- actuating the connector to move forward a second cam member relative to a first cam member, said cam members having cam surfaces which cooperate to translate at least a portion of the axial force of the second cam member to radial force on said first cam member, thereby causing said first cam member to move radially inwardly toward said fiber-receiving channel to urge said terminating fiber contained therein against said stationary platform.

32. The method of claim 31, wherein, during actuation, at a certain point the degree of axial force translated into radial force on said first cam member is significantly reduced.

33. The method of claim 31, wherein there is essentially no axial force translated into radial force on said first cam member.

* * * * *